(12) United States Patent  
Tsumura

(10) Patent No.: US 7,054,563 B2  
(45) Date of Patent: May 30, 2006

(54) MULTI-CHANNEL OPTICAL COMMUNICATION SYSTEM THAT CONTROLS OPTICAL REFLECTION FOR EACH CHANNEL AND OPTICAL TRANSMITTING AND RECEIVING APPARATUS THEREFOR

(75) Inventor: Toshihiro Tsumura, Osaka (JP)

(73) Assignee: Tsumura Research Institute Co., Osaka (JP)

( * ) Notice: Subject to any disclaimer, the term of this patent is extended or adjusted under 35 U.S.C. 154(b) by 845 days.

(21) Appl. No.: 09/775,514

(22) Filed: Feb. 5, 2001

(65) Prior Publication Data

US 2001/0013967 A1    Aug. 16, 2001

(30) Foreign Application Priority Data

Feb. 10, 2000 (JP) ............................ 2000-033858  
Jun. 7, 2000 (JP) ............................ 2000-170514

(51) Int. Cl.  
*H04B 10/00* (2006.01)

(52) U.S. Cl. .................... 398/169; 398/170; 398/140; 398/168; 398/182; 398/183; 398/202; 398/79; 398/91; 455/604; 455/605; 455/603

(58) Field of Classification Search ............... 398/140, 398/169, 170, 168, 182, 183, 202, 79, 91; 455/604, 605, 603  
See application file for complete search history.

(56) References Cited

U.S. PATENT DOCUMENTS

| | | | | |
|---|---|---|---|---|
| 4,887,310 A | * | 12/1989 | Meyzonnette et al. | ...... 398/170 |
| 5,117,301 A | * | 5/1992 | Tsumura | ................. 398/170 |
| 5,278,687 A | * | 1/1994 | Jannson et al. | ............ 398/79 |
| 5,355,241 A | * | 10/1994 | Kelley | .................... 398/170 |
| 5,371,623 A | * | 12/1994 | Eastmond et al. | ......... 398/27 |
| 5,819,164 A | * | 10/1998 | Sun et al. | ................. 455/106 |
| 6,154,299 A | * | 11/2000 | Gilbreath et al. | .......... 398/170 |
| 6,449,406 B1 | * | 9/2002 | Fan et al. | ................. 385/17 |
| 6,501,877 B1 | * | 12/2002 | Weverka et al. | ............. 385/31 |
| 6,624,916 B1 | * | 9/2003 | Green et al. | ............... 398/170 |

OTHER PUBLICATIONS

"On Performance Improvement of Light Intensity Modulation Using Attenuated Total Reflection on Corner Cube," by T. Tsumura et al., Technical Report of IEICE, Sane94-91, Sat94-91, pp. 111-114.

"Most Likely Candidate for Next-Generation Display: Is it Superior to Liquid Crystal?" Nikkei Business, Nov. 15, 1999, pp. 60-64.

* cited by examiner

*Primary Examiner*—Hanh Phan  
(74) *Attorney, Agent, or Firm*—McDermott Will & Emery LLP

(57) ABSTRACT

A multi-channel optical communication system includes an optical transmitting apparatus and an optical receiving apparatus. The optical transmitting apparatus has a retroreflector and a modulator for modulating light reflected by the retroreflector according to a transmission signal. The light receiving apparatus has a light source and a demodulating circuit for demodulating the transmission signal modulated by the modulator from the light emitted from the light source and reflected from the retroreflector. The modulator includes a plurality of optical reflection devices arranged on a reflection plane of the retroreflector and capable of controlling optical reflection independently of each other and a circuit for separately controlling each of the optical reflection devices. The demodulating circuit includes a CCD having a plurality of photoreceptors arranged correspondingly to the arrangement of the optical reflection devices.

7 Claims, 8 Drawing Sheets

MULTI-CHANNEL OPTICAL COMMUNICATION SYSTEM THAT CONTROLS OPTICAL REFLECTION FOR EACH CHANNEL AND OPTICAL TRANSMITTING AND RECEIVING APPARATUS THEREFOR

BACKGROUND OF THE INVENTION

1. Field of the Invention

The present invention relates to optical communication systems using light as a medium. In particular, the invention relates to a multi-channel optical communication system transmitting and receiving a signal for each channel by using a retroreflective device and/or a digital micromirror device, a corner cube being a typical device thereof, to control reflection of light per channel, and relates to an optical transmitting apparatus and an optical receiving apparatus therefor.

2. Description of the Background Art

Because legal restrictions are imposed upon radio communication, efforts are now being concentrated on studies on a communication system using light, on which any legal restrictions have been put, instead of radio waves. One example of such an optical communication system is disclosed in "On Performance Improvement of Light Intensity Modulation Using Attenuated Total Reflection on Corner Cube" by Toshihiro Tsumura et al., Technical Report of IEICE, SANE94-91, SAT94-91, pp. 111–114.

The disclosed communication system is a two-way spatial optical communication system using a laser, having a laser oscillator on one side and a corner cube on the other side. Laser beams emitted from the laser oscillator are modulated by an external signal so that the signal can be recovered from the laser beams received on the receiver side.

The corner cube reflects the incident beams toward the laser oscillator. At this time, it is the peculiar characteristics of the corner cube that it reflects the incoming light from a certain direction back in the same direction. Consequently, the reflected light reaches in the close vicinity of the laser oscillator. A modulator is provided on one plane of the corner cube for modulating the reflected light by controlling the reflection thereupon i.e., reflecting or non-reflecting, or by controlling the direction of the reflection, i.e., in the direction of the light source (retroreflection) or in another direction. The modulator can be driven by an external signal to make the reflected light carry the information. A photo-receiving sensor is provided on the laser oscillator side for receiving the reflected light. A signal transmitted from the corner cube can thus be recovered from an output of the photo-receiving sensor.

Although this communication system accomplishes a two-way optical communication, it has a problem that only one channel can be allocated to each of transmission and reception. Especially, when a image information is to be transmitted by way of the optical communication in a single channel, there arises a problem owing to the amount of the data that a signal interval per one symbol becomes too short, making in the recovering of the signal extremely difficult particularly in an optical communication using a photoelectric transducer element.

Another medium for the multi-channel communication system using light is an optical fiber. The optical fiber enables an efficient optical communication. However, optical fibers must be laid over a wide area, resulting in a problem that an enormous cost is necessary for building an infrastructure. In addition, the optical fiber is not an effective medium for communication with a vehicle and a spatial communication between vehicles.

SUMMARY OF THE INVENTION

Accordingly, one object of the present invention is to provide a multi-channel optical communication system enabling a low-cost and large-capacity optical communication as well as an optical transmitting apparatus and an optical receiving apparatus therefor.

Another object of the invention is to provide a multi-channel optical communication system enabling a low-cost and large-capacity optical communication with a small loss as well as an optical transmitting apparatus and an optical receiving apparatus therefor.

Still another object of the invention is to provide a multi-channel optical communication system enabling a low-cost and large-capacity optical communication with a small loss using no cable or like means as well as an optical transmitting apparatus and an optical receiving apparatus therefor.

A multi-channel optical communication system according to one aspect of the present invention includes an optical transmitting apparatus having a retroreflector reflecting incident light in the direction of a source of the incident light, and a modulator for modulating the light reflected by the retroreflector according to a transmission signal and includes an optical receiving apparatus having a light emitter emitting light and a demodulator for demodulating from the light emitted from the light emitter and reflected from the retroreflector the transmission signal modulated by the modulator. The modulator includes a plurality of reflection condition control devices arranged on a reflection plane of the retroreflector and capable of controlling optical reflection independently of each other and a driver for separately controlling each of the reflection condition control devices according to the transmission signal. The demodulator includes a photoreceiver having a plurality of photoreceptors arranged correspondingly to the arrangement of the reflection condition control devices for receiving the reflected light and a signal demodulating circuit reconstructing the transmission signal from respective outputs of the photoreceptors.

The reflection condition control devices can control the optical reflection independently of each other. Then, reflection from the reflection condition control devices (e.g. micromirror devices) can respectively be controlled by separate pieces of information to transmit a signal on multi-channel from the optical transmitting apparatus toward the optical receiving apparatus as a bundle of light beams each modulated by the separate pieces of information. The multi-channel optical communication enables a longer symbol period and a stable photoelectric conversion by the photoreceiver of the optical receiving apparatus.

As a preferable example, each of the reflection condition control devices includes a digital microactuator provided on the rear side of a transparent plate constituting the reflection plane of the retroreflector and having a control plane according to an applied signal to change the interval between the rear side of the transparent plate and the microactuator. By control of the control plane, reflection from the rear side of the transparent plate is controlled.

The direction of the control plane of the digital microactuator is changed to control reflection from the optical reflection plane. Reflection is achieved as total reflection and thus there occurs a reduced loss. A high accuracy of the angle in retroreflection is maintained. Consequently, the possibility of transmission error is relatively low and a stable communication is possible.

More preferably, each of the reflection condition control devices includes a digital micromirror device having a reflection plane changing its direction according to an applied voltage.

Reflection is controlled by the digital micromirror device and thus the angle of retroreflection is steadily maintained when the light is totally reflected. Consequently, the possibility of transmission error is relatively low and a stable communication is possible.

Preferably, each of the reflection condition control devices includes a magnetic material provided on the reflection plane and enclosed in a transparent capsule and an exciting unit for changing the distribution of optical reflectance on the reflection condition control devices by moving the magnetic material in the transparent capsule by means of a magnetic force.

The magnetic force can be used to change the distribution of the magnetic material thereby control total reflection and non-reflection from the reflection plane. Reflection is achieved as total reflection and thus there is a reduced loss and a high accuracy of the angle in retroreflection is maintained. Consequently, the possibility of transmission error is relatively low and a stable communication is possible.

Preferably, each of the reflection condition control devices includes an optical drive element provided to face a total reflection plane of the retroreflector from the direction opposite to the direction of a source of light incident on the total reflection plane of the retroreflector and changing its shape, in response to radiation of lights with respective specific wavelengths, between a first shape closely fit onto the total reflection plane and a second shape forming a gap between itself and the total reflection plane. Reflection from the total reflection plane is controlled by radiation of lights having respective specific wavelengths to the optical drive element.

The reflection condition control devices are optically driven and accordingly no line is required for transmitting a signal to the reflection condition control devices. A simpler structure of the apparatus is provided, and accordingly the reflection condition control devices can be reduced in size and a higher density is possible. As a result, the number of available channels increases.

An optical transmitting apparatus for a multi-channel optical communication system according to another aspect of the invention includes a retroreflector reflecting incident light in the direction of a source of the incident light and a modulator for modulating the light reflected by the retroreflector according to a transmission signal. The modulator includes a plurality of reflection condition control devices arranged on a reflection plane of the retroreflector and capable of controlling optical reflection independently of each other and a driver for separately controlling each of the reflection condition control devices according to the transmission signal.

The reflection condition control devices can control the optical reflection independently of each other. Then, reflection from the reflection condition control devices can respectively be controlled by separate pieces of information to transmit a signal on multi-channel from the optical transmitting apparatus toward an optical receiving apparatus as a bundle of light beams each modulated by the respective, separate pieces of information. The multi-channel optical communication enables a longer symbol period and a stable photoelectric conversion by a photoreceiver of the optical receiving apparatus.

According to still another aspect of the invention, an optical receiving apparatus for a multi-channel optical communication system includes a photoreceiver receiving a luminous flux containing a plurality of light beams modulated respectively by separate signals and having a plurality of photoreceptors arranged correspondingly to an arrangement of the light beams, and includes a demodulator for demodulating from respective outputs of the photoreceptors a signal transmitted by each of the light beams.

Signals carried by the light beams can be received by the respective photoreceptors to be demodulated for each of the light beams. In this way, reception of the multi-channel optical communication is achieved with a simple structure.

Preferably, the photoreceptors are divided into a plurality of groups, and the optical receiving apparatus further includes a signal demodulating circuit that reconstructs a transmission signal for each of the groups.

Separate groups are provided each corresponding to a plurality of photoreceptors, and a transmission signal is reconstructed for each of the groups. Accordingly, a multi-channel signal transmission is possible using a multi-channel optical communication path.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
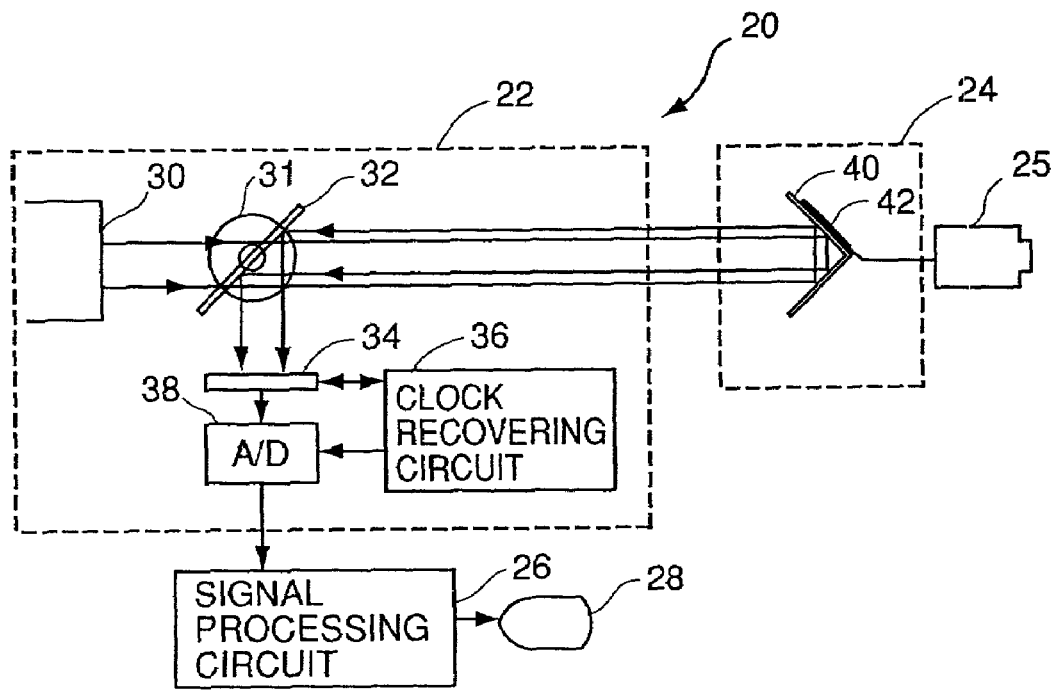
FIG. 1 is a block diagram of an optical communication system according to a first embodiment of the invention.

Referring to FIG. 1, a multi-channel optical communication system 20 according to a first embodiment of the invention includes an optical transmitting apparatus 24 and an optical receiving apparatus 22. A video camera 25, for example, is connected to optical transmitting apparatus 24. Optical transmitting apparatus 24 uses lights to transmit to optical receiving apparatus 22 a signal supplied from video camera 25 as optical signals. Optical receiving apparatus 22 reproduces the image signal output from video camera 25 from the optical signals, and provides the reproduced signal to a signal processing circuit 26 and a monitor 28 to be displayed thereon.

Optical receiving apparatus 22 includes a light source 30 for emitting a luminous flux which laterally extends slightly toward optical transmitting apparatus 24, a beam splitter 32 located on the optical path of light source 30 for splitting light reflected from optical transmitting apparatus 24, a CCD (Charge-Coupled-Device) 34 placed at the position where light beams generated by splitting the light by beam splitter 32 are received, a stepping motor 31 rotating beam splitter 32 about the central axis for directing the light beams reflected from beam splitter 32 onto a light-receiving plane of CCD 34, a clock recovering circuit 36 according to an output of CCD 34 for reproducing a clock component in the signal transmitted from optical transmitting apparatus 24, and an A/D (analog/digital) converting circuit 38 for converting the signal from CCD 34, which is output according to the clock reproduced by clock recovering circuit 36, from an analog signal to a digital signal according to a signal generated by multiplying the clock signal from clock recovering circuit 36. An output of A/D converting circuit 38 is supplied to signal processing circuit 26 to be displayed on monitor 28.

Optical transmitting apparatus 24 includes a corner cube 40 having one plane divided into a large number of pixels, and a modulating device 42 for controlling reflection/non-reflection of each pixel on that one plane of corner cube 40 according to an image signal from video camera 25.

Figure 2:
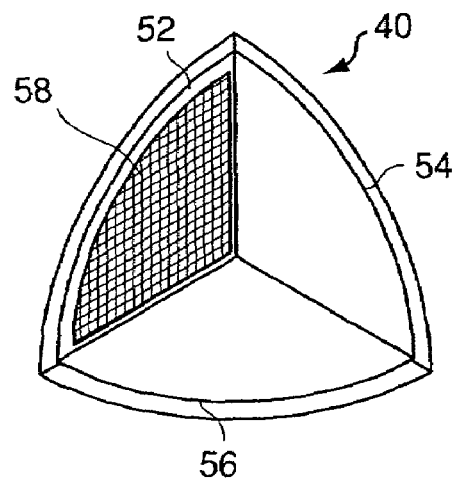
FIG. 2 is an external view of a corner cube.

Referring to FIG. 2, corner cube 40 includes three reflection planes 52, 54 and 56 combined to form right angles therebetween. One of the reflection planes 52, 54 and 56, reflection plane 52 for example, has its surface divided into a plurality of pixels 58. Each pixel 58 is controlled by modulating device 42 with respect to its total reflection/non-reflection.

Figure 4:
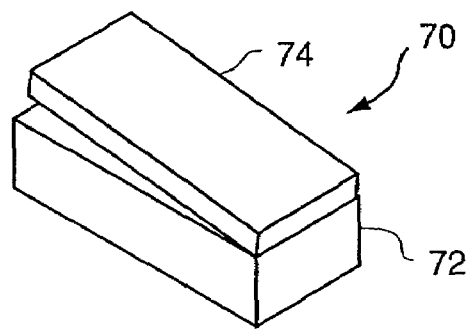
FIG. 4 illustrates an operation of a digital micromirror device.
Figure 5:
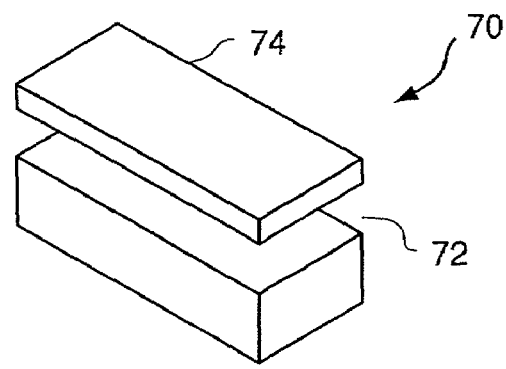
FIG. 5 illustrates an operation of the digital micromirror device.

Referring to FIG. 4, modulating device 42 shown in FIG. 1 includes a large number of digital micromirror devices 70 having their arrangement corresponding to the arrangement of a number of pixels 58 shown in FIG. 2. Each of digital micromirror devices 70 includes a micromirror 74 and a microactuator 72 changing the direction of micromirror 74 depending on an applied voltage. Specifically, when no voltage is applied to digital micromirror device 70, micromirror 74 tilts as shown in FIG. 4 to form a slight angle with microactuator 72. When a predetermined voltage is applied to digital micromirror device 70, micromirror 74 closely fits onto the upper surface of microactuator 72 as shown in FIG. 5.

Such a digital micromirror device is discussed in "Most Likely Candidate for Next-Generation Display. Is It Superior to Liquid Crystal?" in Nikkei Business, Nov. 15, 1999, pp. 60–64.

Figure 6:
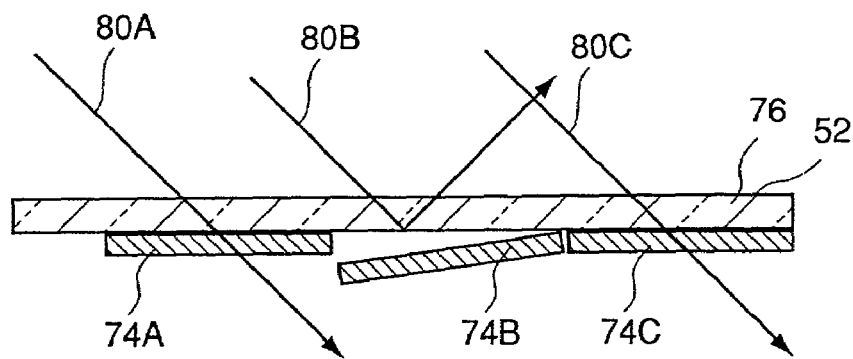
FIG. 6 illustrates control of reflection/non-reflection by using the digital micromirror device.

Referring to FIG. 6, reflection plane 52 includes a transparent glass plate 76 and digital micromirror devices 70 (see FIG. 4) in a great number that are placed on the rear side of glass plate 76. All of these micromirror devices 70 are each positioned such that the reflection plane of the micromirror becomes in contact with the rear side of glass plate 76 when no voltage is applied while micromirror 74 separates from the rear side of glass plate 76 when a voltage is applied. When micromirror 74 has a refractive index different from that of glass plate 76, light rays 80A and 80C are not reflected where no voltage is applied to digital micromirror devices 70 (micromirrors 74A and 74C) as shown in FIG. 6. A light ray 80B is reflected, however, where a voltage is applied to a digital micromirror device 74B.

Therefore, for each of the pixels 58 of corner cube 40 shown in FIG. 2, it is possible to control total reflection/non-reflection by changing a voltage applied to a corresponding digital micromirror device according to an image signal from video camera 25 shown in FIG. 1. In the system of this embodiment, optical reflection/non-reflection of corner cube 40 is controlled for each of the pixels and light from each pixel is received and demodulated by optical receiving apparatus 22. In this way, a signal can be recovered for each of the pixels.

The digital micromirror devices are employed in the system of this embodiment. However, if reflection plane 74 is placed on the rear side of the transparent plate constituting the light reflection plane, reflection plane 74 may not necessarily have a light-reflecting nature. Just a difference in the refractive index between the transparent plate and reflection plane 74 is required such that total reflection of light occurs by placing reflection plane 74 in close contact with the rear side of the transparent plate and non-reflection of light occurs by providing a certain distance therebetween.

Optical communication system 20 according to the first embodiment operates as follows. Note that relative locations of light source 30 and corner cube 40 respectively are assumed to be pre-adjusted to be almost constant. However, even if the relative locations change because one or both of optical receiving apparatus 22 and optical transmitting apparatus 24 is/are on a vehicle(s) for example, as discussed later, the angle of rotation of beam splitter 32 can be adjusted to allow CCD 34 to stably receive the light reflected from optical transmitting apparatus 24.

A luminous flux is emitted from light source 30 toward corner cube 40. The light incident on corner cube 40 is reflected therefrom to return toward light source 30. At this time, reflection/non-reflection from each pixel 58 on one reflection plane 52 on corner cube 40 is controlled according to an image signal from video camera 25. Consequently, light is reflected from positions corresponding to certain pixels and light is not reflected from positions corresponding to other pixels.

Beam splitter 32 laterally deviates the optical path of the light reflected from corner cube 40 by 90° to direct the light onto the light-receiving plane of CCD 34. CCD 34 repeatedly receives light and outputs a received-light signal at intervals of a predetermined period. Clock recovering circuit 36 controls the period of the light reception such that the light reception period coincides as close as possible with one period of a transmission signal from optical transmitting apparatus 24. Clock recovering circuit 36 reproduces a clock signal as described above based on the output of CCD 34 to control the operation of CCD 34 and provides to A/D converting circuit 38 a signal produced by multiplying the clock signal by a predetermined number. A/D converting circuit 38 converts a serial analog signal from CCD 34 into a digital signal according to the multiplied clock signal from clock recovering circuit 36 and supplies the resultant digital signal to signal processing circuit 26. The signal supplied to signal processing circuit 26 is consequently similar to a serial digital signal output from video camera 25. The signal is processed by signal processing circuit 26 to be displayed on monitor 28 and thus an image taken by video camera 25 is reproduced on monitor 28.

In this case, the optical signal sent from optical transmitting apparatus 24 toward optical receiving apparatus 22 is a multi-channel optical signal having its components in parallel corresponding to respective pixels. The signal period of each channel is thus remarkably longer than that in serial transmission of an image signal by one channel. As a result, CCD 34 can receive light over a longer period and a stable demodulation is accordingly possible.

According to this embodiment, micromirrors 74 are arranged to fit closely onto glass plate 76 as shown in FIG. 6 for controlling total reflection from the interface (total reflection plane) between glass plate 76 and micromirrors 74. However, the present invention is not restricted to such a structure. For example, micromirrors 74 may be arranged in a matrix to constitute reflection plane 52 itself shown in FIG. 2. When this arrangement is employed, a micromirror at a normal position may reflect light in a predetermined direction correctly, and change its position to reflect light in a direction different from the predetermined direction when a predetermined voltage is applied. Alternatively, the micromirror may operate in a reverse way. This arrangement is detailed later in conjunction with FIGS. 15 and 16.

Figure 3:
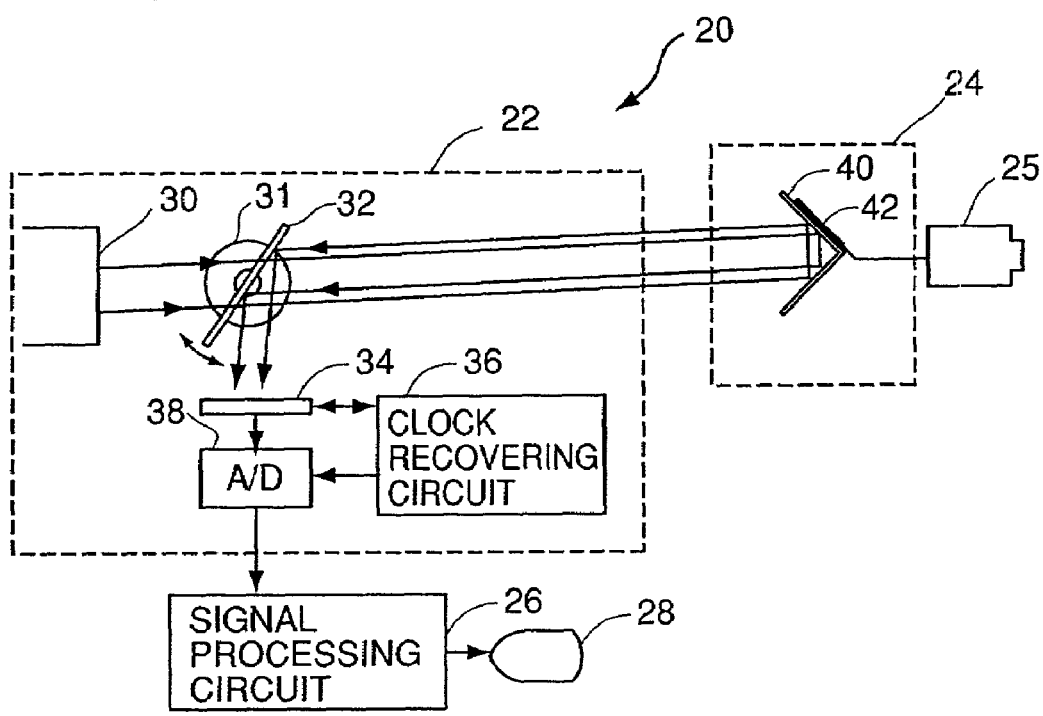
FIG. 3 is a block diagram of the optical communication system according to the first embodiment having a beam splitter angled differently.

Referring to FIG. 3, the position of optical transmitting apparatus 24 relative to that of optical receiving apparatus 24 is here assumed to change from the state shown in FIG. 1. The light beam emitted from light source 30 laterally spreads to a certain degree as described above. Therefore, even if the position of optical transmitting apparatus 22 shifts, the light beam is partially reflected from corner cube 40 and returns. The reflected light and the light incident on corner cube 40 have the same direction, which means that the angle of incidence onto beam splitter 32 differs from that in FIG. 1. If beam splitter 32 is oriented in the original direction, the reflected light cannot be directed onto the light-receiving plane of CCD 34.

The angle of beam splitter 32 is accordingly adjusted by stepping motor 31 to adjust the angle of reflection of the incident beam. The light reflected from corner cube 40 can thus be directed onto the light-receiving plane of CCD 34.

Second Embodiment

In the optical communication system discussed above according to the first embodiment, the optical communication is in itself a multi-channel communication, while an input signal and a demodulated signal having been transmitted are both serial signals. The consequence is that a signal corresponding to one channel is transmitted. The present invention is not limited to such an embodiment. For example, signals of a number of channels may be transmitted through multi-channel optical communication that is demodulated on the receiver side as separate signals corresponding to respective channels, which is accomplished by an optical communication system 120 according to a second embodiment.

Figure 7:
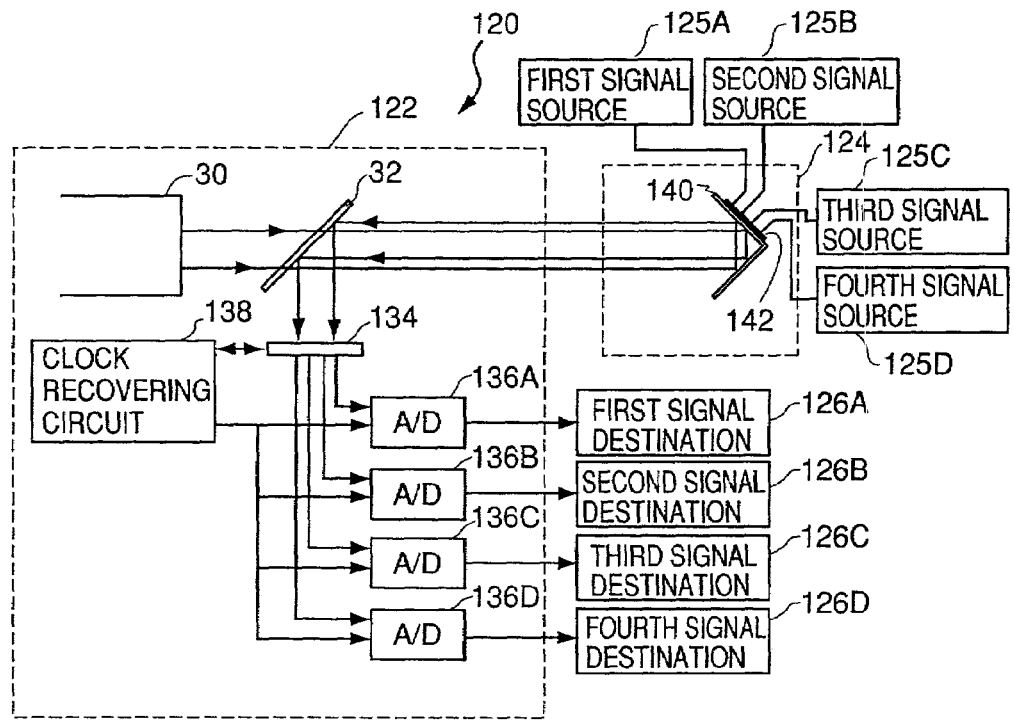
FIG. 7 is a block diagram of an optical communication system according to a second embodiment of the invention.

Referring to FIG. 7, optical communication system 120 includes an optical receiving apparatus 122 and an optical transmitting apparatus 124.

Optical transmitting apparatus 124 includes, similarly to optical transmitting apparatus 24 in the first embodiment, a corner cube 140 having one plane divided into a plurality of pixels and a modulating device 142 for separately driving respective pixels.

Figure 8:
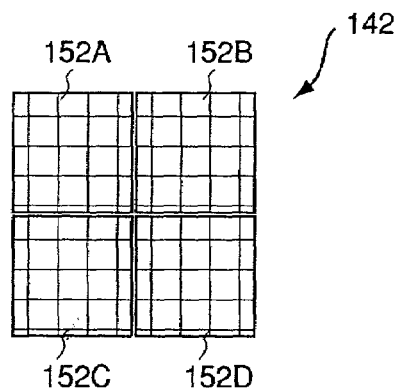
FIG. 8 shows an arrangement of partial modulating circuits employed in the second embodiment.

Referring to FIG. 8, modulating device 142 includes four partial modulating circuits 152A–152D in this embodiment. Partial modulating circuits 152A–152D are driven by respective signals from separate signal sources 125A–125D. In this example, signals supplied serially from respective signal sources 125A–125D are temporarily stored in storage elements arranged as shown in FIG. 8 and thereafter the stored signals are simultaneously provided to respective elements of modulating device 142. In this way, the serially input signals can be transferred in parallel in a longer signal period.

Optical receiving apparatus 122 includes a light source 30 and a beam splitter 32 arranged similarly to those in the first embodiment, a CCD 134 for receiving bundles of light beams resultant from splitting by beam splitter 32, a clock recovering circuit 138 for reproducing a clock signal according to an output of CCD 134 to control the period in which CCD 134 receives the light and providing a signal obtained by multiplying the clock signal, and A/D converting circuits 136A–136D receiving, in parallel, signals that are serially output from respective four regions of CCD 134 for converting those analog signals to digital ones according to the multiplied clock signal from clock recovering circuit 138. Respective outputs of A/D converting circuits 136A–136D are supplied to destinations 126A–126D corresponding to respective signal sources 125A–125D.

Optical communication system 120 according to the second embodiment operates as follows. Signal sources 125A–125D provide respective signals independently of each other to modulating device 142. Partial modulating circuits 152A–152D of modulating device 142 store the serially supplied signals successively pixel by pixel, and provide the signals to corresponding digital micromirror devices at a certain timing. Accordingly, when light emitted from light source 30 is reflected from corner cube 140, reflection/non-reflection is controlled per pixel. Light modulated by the original signal is thus incident on beam splitter 32 and further incident on a light-receiving plane of CCD 134. Clock recovering circuit 138 reproduces a clock signal based on an output of CCD 134 to control the output period of CCD 134. At the same time, clock recovering circuit 138 generates a signal by multiplying that clock signal by a predetermined number and provides the resultant signal to A/D converting circuits 136A–136D. Each of A/D converting circuits 136A–136D converts a signal serially output from a corresponding one-fourth plane of CCD 134 into a digital signal and supplies the digital signal to a corresponding one of destinations 126A–126D. In this way, the signals supplied from multiple signal sources 125A–125D are simultaneously transmitted to optical receiving apparatus 122 via one multi-channel optical communication path to be supplied independently of each other to corresponding destinations 126A–126D respectively.

According to the second embodiment, the optical communication is achieved by using serial signals all together that are not image signals. The optical communication itself is a multi-channel communication in this case, so that a longer symbol period is possible compared with that in the serial communication of each signal and a stable optical communication is thus achieved.

Third Embodiment

The system in the first embodiment first provides the serial image signal output from video camera 25 (see FIG. 1) to modulating device 42 and then transmits the signal as a multi-channel signal by way of the optical communication. The present invention is not limited to the communication in the form of the first embodiment even if the communication is applied to image transmission only. For example, parallel input of a number of image signals is possible by an optical communication system 220 according to a third embodiment.

Figure 9:
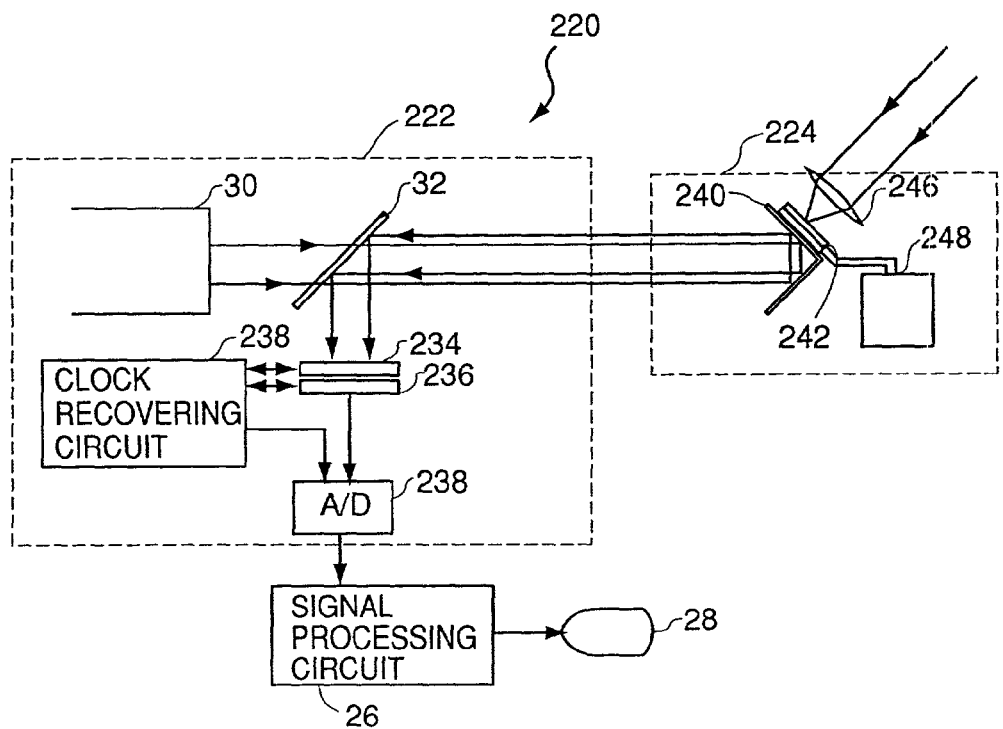
FIG. 9 is a block diagram of an optical communication system according to a third embodiment of the invention.

Referring to FIG. 9, optical communication system 220 includes an optical transmitting apparatus 224 and an optical receiving apparatus 222.

Optical transmitting apparatus 224 includes a corner cube 240, a light-receiving and modulating device 242 placed on the rear side of one plane of corner cube 240 having a charge-coupled device (CCD) and digital micromirror devices as described above that are integrated into one unit, an optical system 246 for forming an optical image of a subject on an imaging plane (light-receiving plane) of the CCD of light-receiving and modulating device 242, and a driver device 248 for controlling the light reception period of light-receiving and modulating device 242 as well as transfer of charges to the digital micromirror devices.

Driver device 248 provides charges generated on the light-receiving plane of light-receiving and modulating device 242 in a certain period simultaneously to the digital micromirror devices to control the direction in which the reflection plane of each digital micromirror device faces. At the same time, driver device 248 erases the charges on the light-receiving plane to receive light in the subsequent period, and repeats this operation.

Optical receiving apparatus 222 includes a light source 30 and a beam splitter 32 as described above, a CCD 234 placed at the position where light beams resultant from split by beam splitter 32 are received, a charge transfer device 236 structured similarly to the CCD for receiving and holding in parallel charges from respective light-receiving elements of CCD 234 and supplying the charges in serial, a clock recovering circuit 238 for reproducing a clock component included in received signals according to an output of CCD 234 to control the operations of CCD 234 and charge transfer device 236 and supplying a signal produced by multiplying that clock signal, and an A/D converting circuit 238 according to the multiplied clock signal from clock recovering circuit 238 for converting the serial signals from charge transfer device 236 into a digital signal. The output of A/D converting circuit 238 is provided to a signal processing circuit 26 and then displayed on a monitor 28 as done in the first embodiment.

Optical communication system 220 according to the third embodiment operates as follows. Driver device 248 erases charges on the light-receiving plane of light-receiving and modulating device 242 to start receiving light. An optical image of a subject is formed by optical system 246 on the light-receiving plane, and photoelectric transducer elements on the light-receiving plane accumulate respective charges according to an amount of incident light. Driver device 248 transfers the charges at a predetermined timing to corresponding digital micromirror devices and erases the charges on photoreceptor devices of the CCD. Control by driver device 248 causes the reflection plane of each of micromirror devices constituting light-receiving and modulating device 242 to change its position to a total-reflection position or non-reflection position.

Light emitted from light source 30 of optical receiving apparatus 222 is reflected from corner cube 240 to incident on beam splitter 32. At this time, from one plane of corner cube 240, no reflection occurs at positions corresponding to certain pixels and reflection occurs at positions corresponding to other pixels because of the operation of light-receiving and modulating device 242. As a result, the light reflected from corner cube 240 toward beam splitter 32 is a multi-channel bundle of lights having respective reflected light beams modulated according to respective states of the elements. The bundle of lights reflected from beam splitter 32 is incident onto CCD 234 and accordingly charges distributed similarly to those by the optical image of the subject is produced on CCD 234. Clock recovering circuit 238 accumulates the charges on CCD 234 for a period corresponding to one symbol interval and thereafter transfers the charges in parallel to charge transfer device 236. Simultaneously, clock recovering circuit 238 erases charges of respective photoelectric transducer elements on CCD 234.

According to the clock signal from clock recovering circuit 238, charge transfer device 236 outputs the accumulated charges in serial to A/D converting circuit 238. A/D converting circuit 238 converts this signal into a digital signal according to the multiplied clock signal from clock recovering circuit 238 and supplies that digital signal to signal processing circuit 26.

In this way, the optical communication system in the third embodiment can convert optical images of subjects formed on the light-receiving plane on the optical transmitter side directly into parallel signals and further transfer the signals as parallel optical signals to the optical receiver side. A longer symbol interval is accomplished on the receiver side, compared with that in the parallel transmission of this image signal on one channel, and a stable optical communication is thus possible.

Although optical system 246 is placed at a fixed position in the example shown in FIG. 9 to allow an image of subjects to be formed on the light-receiving plane, the present invention is not restricted to such an example. The optical system can be placed in various manners provided that the optical image of the subject or subjects is formed on the light-receiving plane.

Fourth Embodiment

As clearly understood from the first to the third embodiments, the optical communication system can transmit signals from a plurality of signal sources in parallel. The maximum number of channels for this communication is the same as the number of pixels (functioning to control the total reflection condition on the reflection plane as explained below, hereinafter referred to as "total reflection condition control device") formed on the corner cube. Of course those total reflection condition control devices located in the edge region of the reflection plane may not be available. However, an optical communication by a considerably large number of channels is possible by using only the total reflection condition control devices provided in the central region and thereabout of the corner cube. A fourth embodiment provides an optical communication system by which an independent communication is possible for each of the channels.

Figure 10:
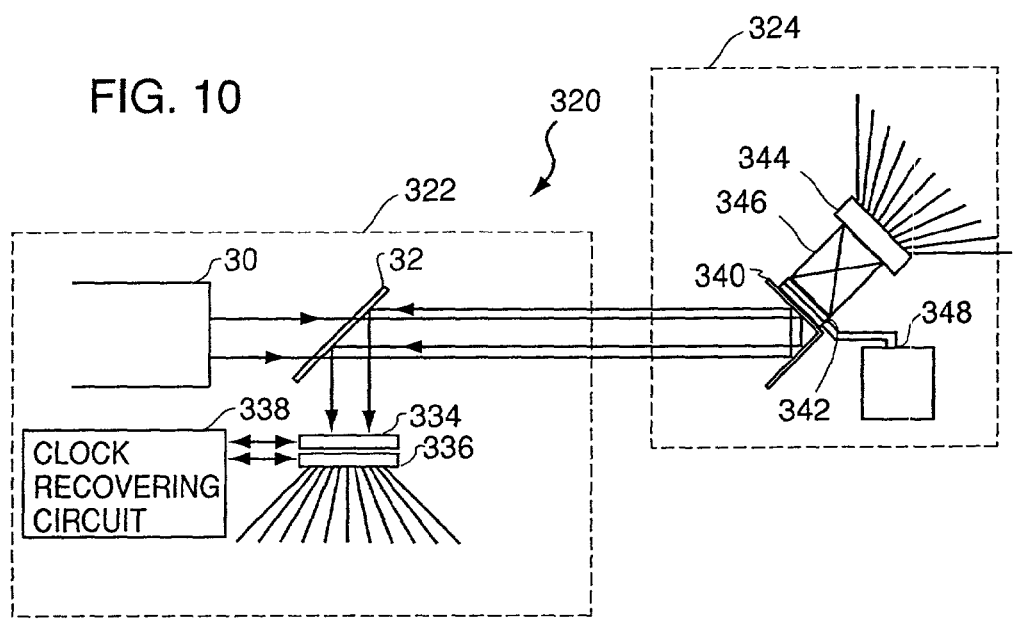
FIG. 10 is a block diagram of an optical communication system according to a fourth embodiment of the invention.

Referring to FIG. 10, an optical communication system 320 includes an optical transmitting apparatus 324 and an optical receiving apparatus 322.

Optical transmitting apparatus 324 includes an bundling device 344 for bundling signals respectively from a number of signal sources, a modulating device 342 having a number of digital micromirror devices, connection lines 346 for connecting signals bundled by bundling device 344 independently of each other to respective digital micromirror devices of modulating device 342, a driver device 348 for driving modulating device 342, and a corner cube 340 with the rear side of one reflection plane on which modulating device 342 is provided.

Optical receiving apparatus 322 includes a light source 30 and a beam splitter 32, a CCD 334 provided at the position where a bundle of light beams resultant from splitting by beam splitter 32 is received, a clock recovering circuit 338 for reproducing a clock signal according to an output of CCD 334 to drive CCD 334, and a splitting circuit 336 receiving respective outputs of photoelectric transducer elements of CCD 334 in parallel, amplifying those signals, converting the signals into digital signals, and output those signals separately.

Clock recovering circuit 338 causes photoelectric conversion in CCD 334 for one symbol period and respective signals from the photoelectric transducer elements are output in parallel to splitting circuits 336 at the end of the period. At the same time, clock recovering circuit 338 erases respective charges of the photoelectric transducer elements of CCD 334 to prepare for photoelectric conversion in the subsequent period.

Optical communication system 320 according to the fourth embodiment operates as follows. Signals collected from a large number of different signal sources are bundled by bundling device 344 and then provided through connection lines 346 to modulating circuit 342. Modulating circuit 342, under control of driver device 348, takes in signals supplied from connection lines 346 at a predetermined interval, and provides the signals to respective digital micromirror devices. Each digital micromirror device changes the position of its reflection plane according to a value of its corresponding signal.

Light emitted from light source 30 is incident on corner cube 340 and reflected therefrom. At this time, on one reflection plane of corner cube 340, reflection/non-reflection is controlled for each element depending on the position of the reflection plane of the digital micromirror device. Consequently, the light reflected from corner cube 340 toward beam splitter 32 is a bundle of light beams each carrying a signal for corresponding channel modulated by modulating device 342.

The bundle of light beams reflected from beam splitter 32 is incident on CCD 334 to generate, for each of the elements of CCD 334, charges corresponding to each element. The output of each photoelectric transducer element is provided to splitting circuit 336 by control by clock recovering circuit 338 that is converted into a digital signal to be transmitted to a corresponding destination.

In the optical communication system according to the fourth embodiment, a number of signal sources and total reflection condition control devices on the corner cube are in a one-to-one relation, and thus optical communication channels can be provided in the same number as that of the total reflection condition control devices. A resultant advantage is that a large number of channel signals can stably be transmitted in a remarkably small space. For example, if the total reflection condition control devices are provided in an arrangement of 1000×1000, the number of available channels is 1000×1000=1,000,000, which enables a broadband communication by way of the optical communication.

<Another Example of Total Reflection Condition Control Device>

In the above discussion, the employed corner cube has total reflection condition control devices formed by providing digital micromirror devices on the front surface of a light reflection plane or digital microactuators on the rear side of the transparent plate constituting the light reflection plane. The structure of the total reflection condition control devices is not limited to this, one example being illustrated in FIG. 11.

Figure 11:
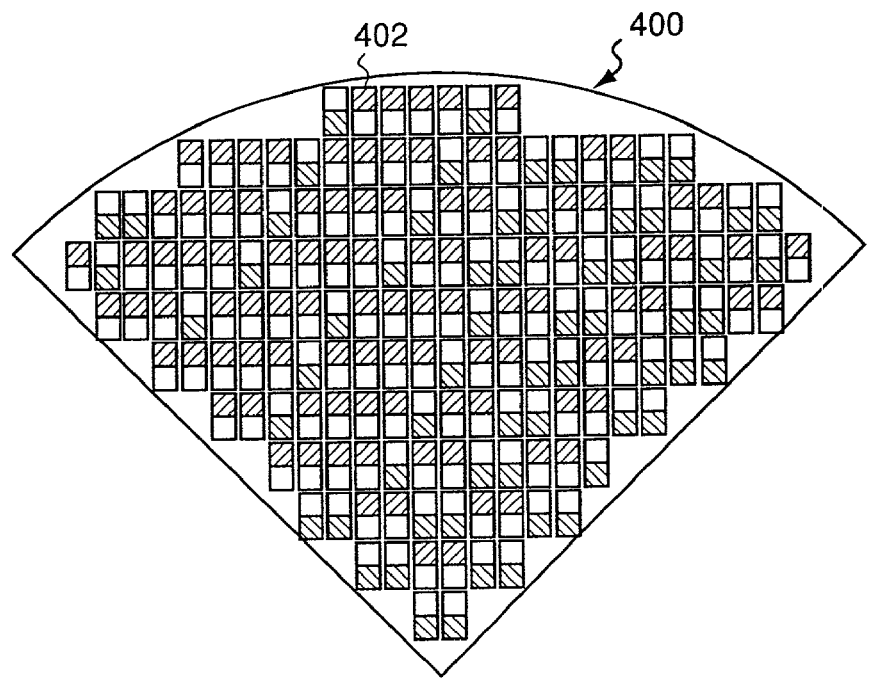
FIG. 11 shows another example of another corner cube plane having a total reflection condition control device.
Figure 12:
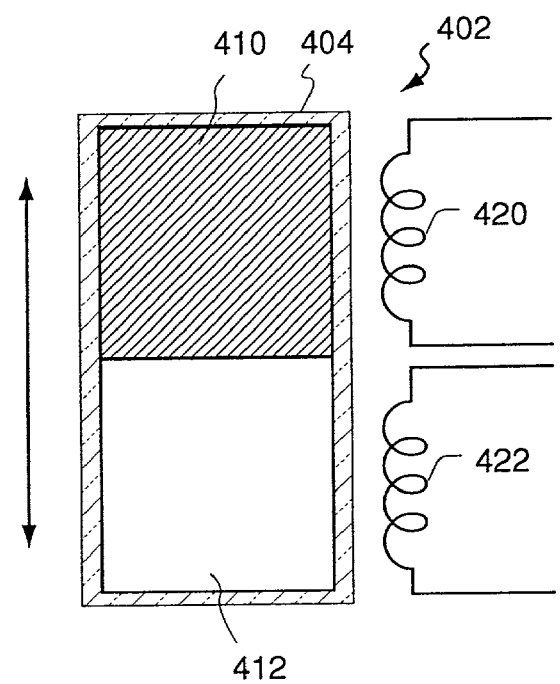
FIG. 12 is a schematic diagram of a group of total reflection condition control devices employed in the example shown in FIG. 11.

Referring to FIG. 11, on one reflection plane of a corner cube 400, a plurality of total reflection condition control devices 402 are arranged for controlling the total reflection condition of a prism. As shown in FIG. 12, each total reflection condition control device 402 includes a transparent capsule 404, capsule 404 being formed of the same material as that of the prism, an opaque magnetic fluid 410 enclosed in transparent capsule 404, and two electromagnets 420 and 422 formed separately in half regions respectively of transparent capsule 404 to generate magnetic fields by being applied with a current.

A magnetic field is generated when a current flows through electromagnet 420 in FIG. 12, for example, and accordingly magnetic fluid 410 gathers in the direction of electromagnet 420. As a result, a transparent portion 412 appears that includes no magnetic fluid 110. On the contrary, application of a current to electromagnet 422 causes magnetic fluid 410 to be attracted toward electromagnet 422. Consequently, the region indicated by reference number 410 becomes transparent differently from that in FIG. 12. Accordingly there is no area where the magnetic fluid is in contact with a prism plane and thus a total reflection state occurs in this region. The region indicated by reference number 412 becomes opaque where the magnetic fluid is in contact with the prism plane, so that total reflection is inhibited. In this total reflection condition control device 402, the distribution of the refractive index can be varied depending oil whether a current is applied to electromagnet 420 or 422 in order to modulate and reflect incident light accordingly.

Although the magnetic fluid is used in the example shown in FIG. 12, the magnetic fluid may be replaced with a bundle of a number of long and narrow tubes with a number of tiny bar-magnets enclosed therein having respective directions fixed in the same direction for example. In this case, the south pole of a magnetic field is positioned on one end of transparent capsule 404 for example. All of the bar-magnets are then moved in the same direction by the magnetic force between respective magnetic poles of the bar-magnets and the south pole. The bar-magnets are moved in the opposite direction if the north pole is positioned there instead of the south pole. In this way, the distribution of those portions causing total reflection in the group of total reflection control devices can be varied in the similar manner to that using the magnetic fluid.

When such tiny bar-magnets are employed and magnetic poles of the same magnetic property are positioned on both ends of transparent capsule 404, an attractive force is exerted on the bar-magnets from one magnetic pole and a repulsive force is exerted thereon from the other magnetic pole. As a result, the movement of the bar-magnets is accelerated when the magnetic property of the magnetic poles is changed. An advantage of this structure is that the response is improved compared with the structure where only one magnetic pole is used.

<Further Example of Total Reflection Condition Control Device>

As a further example of the total reflection condition control device, a microactuator may be employed that is controlled by light instead of current. In particular, an actuator having a high response speed can be achieved by using a material deformed by being subjected to light like a macromolecular compound called polydiacetylene.

Figure 13:
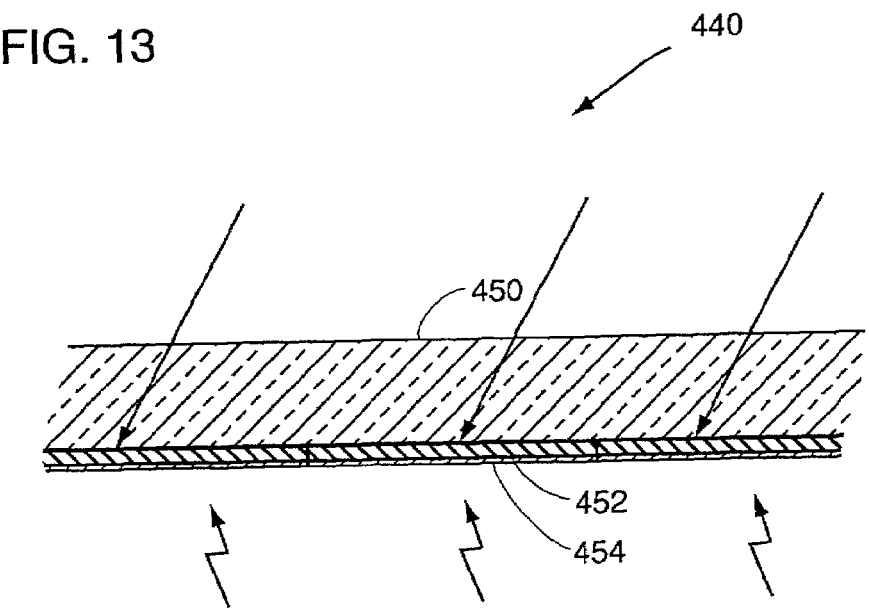
FIG. 13 is a cross section showing a further example of the total reflection condition control device.

FIG. 13 shows a cross section of a total reflection condition control device 440 having such a microactuator controlled by light. Referring to FIG. 13, the microactuator includes a total reflection controller 452 located on a total reflection plane of a prism 450 of a corner cube that is fit closely to the total reflection plane of prism 450 in a normal state, formed of a thin and slightly resilient material having a higher density than that of prism 450, and includes a thin film 454 of polydiacetylene bonded to the plane of total reflection controller 452 opposite to the plane fit closely to prism 450. Total reflection controller 452 is bonded on its edge portion to the rear side of prism plane 450. The material employed for total reflection controller 452 has a resiliency which is enough to fit closely to the total reflection plane of prism 450 and form a gap between itself and the total reflection plane by being deformed, the gap having its size preventing total reflection, as described later.

As shown in FIG. 13, total reflection controller 452 is in close contact with the total reflection plane of prism 450 in a first state. Therefore, total reflection of light incident on glass plate 450 does not occur from the total reflection plane of prism 450, and the light passes through toward total reflection controller 452. In other words, no total reflection of the light occurs on the total reflection plane.

Polydiacetylene is known having its volume increasing by approximately 3% by being subjected to light with a wavelength of 450–550 nanometers and returning to its original state by being subjected to light with a wavelength of 350–400 nanometers.

Figure 14:
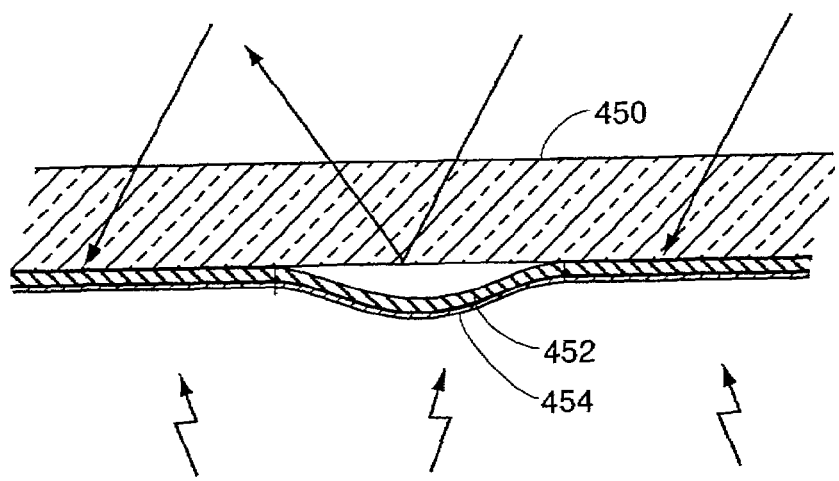
FIG. 14 is a cross section showing an operational principle of the total reflection condition control device.

This characteristic is used to direct light with a wavelength of 450–550 nanometers from the rear side onto a total reflection condition control element corresponding to a portion where total reflection should occur. In this portion, polydiacetylene thin film 454 increases in volume, generating a gap as shown in the central part of FIG. 14 between itself and the total reflection plane of prism 450. Total reflection of light thus occurs that is incident on that total reflection condition control device.

On the other hand, light with a wavelength of 350–400 nanometers is directed from the rear side onto a total reflection condition control element corresponding to a portion where no total reflection should occur. Then, polydiacetylene thin film 454 decreases in volume, so that the entire total reflection condition control element deforms together with total reflection controller 452 with the central part adhering to prism plane 450. As a result, no total reflection occurs of light incident onto the total reflection plane of prism 450.

In this way, the material with its characteristic of being deformed by light is employed to drive a reflection condition control device. The response speed is then enhanced and the structure is relatively simplified. In addition, the reflection condition control device is driven by light so that no line is required for driving the reflection condition control device by a signal. Consequently, the system can further be reduced in size and a higher-density multi-channel optical communication is possible <Example of Reflection Condition Control Device>

Figure 15:
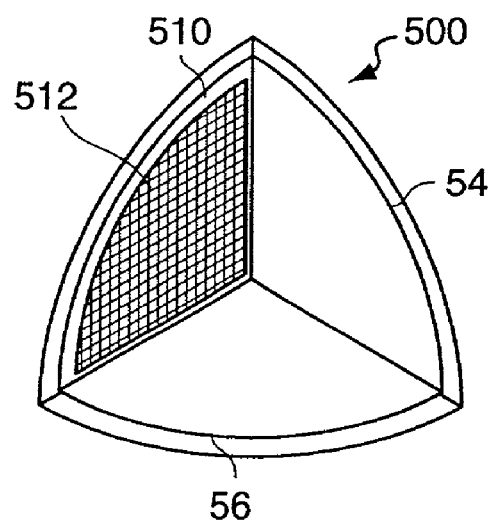
FIG. 15 is a perspective view showing a modification of the corner cube using a digital micromirror device.
Figure 16:
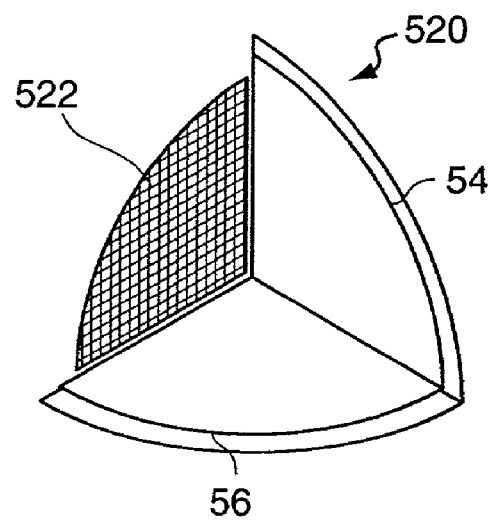
FIG. 16 is a perspective view showing another modification of the corner cube using a digital micromirror device.

Modifications of corner cube 40 shown in FIG. 2 are shown in FIGS. 15 and 16. Referring to FIG. 15, a corner cube 500 is different from corner cube 40 in FIG. 2 in that the former includes, instead of reflection plane 52 shown in FIG. 2, a substrate 510 made of a material that does not reflect light and forming right angles with respect to reflection planes 54 and 56 respectively, and includes a plurality of digital micromirror devices 512 arranged in a matrix on the plane of substrate 510 facing reflection planes 54 and 56. The material forming substrate 510 may be transparent or opaque. Further, the material may reflect light.

Each of micromirror devices 512 has its reflection plane with the direction controllable with respect to first and second directions. In the first direction, the reflection plane of the digital micromirror device is included in the plane orthogonal to reflection planes 54 and 56. The second direction may be any different from the first direction. In other words, the second direction is any direction except for the direction in which the reflection plane of the micromirror device is orthogonal to reflection planes 54 and 56.

When this corner cube 500 is used and the reflection plane of the digital micromirror device is in the first direction, light incident on the reflection plane of that digital micromirror device is reflected in parallel with the direction of incidence. When the reflection plane of the digital micromirror device is directed in the second direction, the light is reflected in the direction different from the direction of incidence. Therefore, corner cube 500 is applicable to the multi-channel optical communication as accomplished in the first embodiment.

A corner cube 520 shown in FIG. 16 is characterized in that no substrate 510 is employed as that used in FIG. 15. A reflection plane is constituted of a plurality of micromirror devices 522 arranged in a matrix. This corner cube is also applicable to the multi-channel optical communication if control is possible of the direction of the reflection plane of each of digital micromirror devices 522 with respect to first and second directions in a similar manner to that shown in FIG. 15.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multi-channel optical communication system comprising:
    an optical transmitting apparatus including
    a retroreflector reflecting incident light in the direction of a source of the incident light and
    a modulator for modulating the light reflected by the retroreflector according to a transmission signal; and
    an optical receiving apparatus including
    a light emitter emitting light and
    a demodulator for demodulating from the light emitted from the light emitter and reflected from the retroreflector the transmission signal modulated by the modulator,
    the modulator including
    a plurality of reflection condition control devices arranged on a reflection plane of the retroreflector and capable of controlling optical total reflection independently of each other and a driver for separately controlling each of the reflection condition control devices according to the transmission signal, and the demodulator including a photoreceiver having a plurality of photo receptors arranged correspondingly to arrangement of the plurality of reflection condition control devices for receiving the reflected light and a signal demodulating circuit reconstructing the transmission signal from respective outputs of the plurality of photoreceptors.

2. The multi-channel optical communication system according to claim 1, wherein each of the reflection condition control devices includes a digital microactuator provided on the rear side of a transparent plate constituting the reflection plane of the retroreflector and having a control plane according to an applied signal to change its direction, the direction of the control plane being changed to control reflection from the rear side of the transparent plate.

3. The multi-channel optical communication system according to claim 1, wherein each of the reflection condition control devices includes a digital micromirror device having a reflection plane changing its direction according to an applied voltage.

4. A multi-channel optical communication system comprising:

an optical transmitting apparatus including a retroreflector reflecting incident light in the direction of a source of the incident light and a modulator for modulating the light reflected by the retroreflector according to a transmission signal, and an optical receiving apparatus including a light emitter emitting light and a demodulator for demodulating from the light emitted from the light emitter and reflected from the retroreflector the transmission signal modulated by the modulator, the modulator including a plurality of reflection condition control devices arranged on a reflection plane of the retroreflector and capable of controlling optical reflection independently of each other and a driver for separately controlling each of the reflection condition control devices according to the transmission signal, and the demodulator including a photoreceiver having a plurality of photoreceptors arranged correspondingly to arrangement of the plurality of reflection condition control devices for receiving the reflected light and a signal demodulating circuit reconstructing the transmission signal from respective outputs of the plurality of photoreceptors.

5. The optical transmitting apparatus for a multi-channel optical communication system according to claim 4, wherein each of the reflection condition control devices includes a digital micromirror device having a reflection plane changing its direction according to an applied voltage, and the reflection plane of the digital micromirror device is controllable in either of a first direction where the reflection plane of the digital micro mirror device is included in the reflection plane of the retroreflector or a second direction where the reflection plane of the digital micromirror device is not included in the reflection plane of the retroreflector.

6. The optical transmitting apparatus for a multi-channel optical communication system according to claim 5, wherein the retroreflector is formed of first, second and third planes orthogonal to each other, the first plane and the second plane are reflection planes, and the third plane is constituted by the reflection plane of the digital micromirror device facing in the first direction.

7. The optical transmitting apparatus for a multi-channel optical communication system according to claim 6, wherein a plurality of the digital micromirror devices are arranged on a substrate provided in a direction orthogonal to the first and second planes.

* * * * *